Feb. 29, 1944. E. M. MOREHOUSE 2,342,958
SUPPORTING CLIP FOR WIRES
Filed July 6, 1942
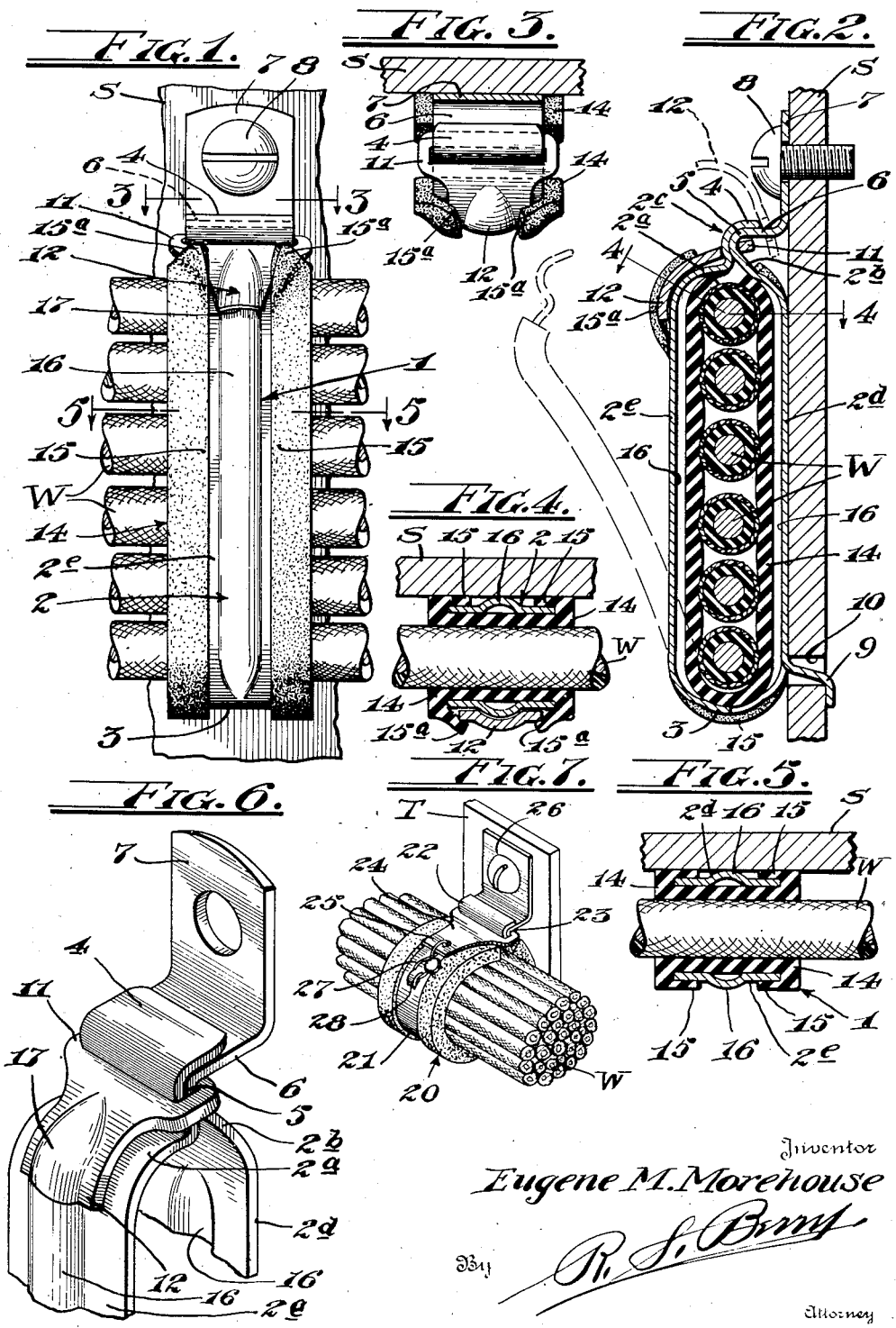
Inventor
Eugene M. Morehouse
by R. S. Berry
Attorney Patented Feb. 29, 1944

2,342,958

UNITED STATES PATENT OFFICE 2,342,958

SUPPORTING CLIP FOR WIRES

Eugene M. Morehouse, Tujunga, Calif., assignor to Adel Precision Products Corp., a corporation of California Application July 6, 1942, Serial No. 449,919

6 Claims. (Cl. 248—68)

This invention relates to and has for an object the provision of a novel clip for supporting electrical conductors or wires or other members of lines extending throughout aircraft and the like and capable of support by the clip; the clip being constructed so that it may be readily clamped around a group of wires and secured to a structural part of the aircraft with the wires firmly held closely grouped and protected against chafing and stresses resulting from friction and the severe vibrations to which parts of aircraft are usually subjected.

Another object of my invention is to provide a light-weight clip of the character described which will save time, labor and material in the anchoring and supporting of electrical wires in the construction of aircraft compared to present practice.

A further object of my invention is to provide a wire supporting clip in which a novel locking or clamping means makes it possible to secure the clip to the desired structural part of the aircraft then clamp the group of wires to be supported; or if desired the clip may be clamped on the wires first and then secured to the aircraft structural part; in either case the clamping means making it possible to open or unlock the clip and release the wires at will.

Yet another object is to provide a clip of the character described which includes a cushion strip lining the metal strap body portion of the clip to provide a protective seat for the wires clamped and held by the clip.

Another object of my invention is to provide a clip of the character described wherein an elongated loop portion for embracing and clamping the wires is equipped with means for detachably securing both ends of the loop to the structural part of the aircraft to insure a secure fastening thereof.

With the foregoing objects in view, together with such other objects and advantages as may subsequently appear, the invention resides in the parts and in the combination, construction and arrangement of the parts hereinafter described and claimed, and illustrated by way of example in the accompanying drawing, in which:

Fig. 1 is a fragmentary front elevational view of a clip embodying my invention as installed;

Fig. 2 is a vertical sectional view of the clip shown in Fig. 1, the clamp and clip being shown in open or released position in dotted lines;

Fig. 3 is a cross sectional view taken on the line 3—3 of Fig. 1;

Fig. 4 is a cross sectional view taken on the line 4—4 of Fig. 2;

Fig. 5 is a cross sectional view taken on the line 5—5 of Fig. 1;

Fig. 6 is an enlarged fragmentary perspective view of the clip with the cushion removed and particularly showing the clamping or locking means;

Fig. 7 is a perspective view of a modified form of my invention as to the shape of the clip.

Referring to the drawing more specifically, it is seen that my improved clip comprises a bendable strap 1 formed of somewhat resilient form-retaining material either plastic or metal and pre-formed to provide an elongated ovicular loop portion 2 adapted to closely embrace and hold a group of wires W.

As here provided the closed end 3 of the loop 2 is rounded or semi-circular, while the other ends 2a and 2b of the loop portion proper are curved inwardly convergently and adapted to abut at the point 2c thereby encircling the wires with both ends of the loop portion rounded or curved to better conform to the wires at such points. One end of the strap 1 is formed as a rounded hook 4 and extended beyond loop end 2a so as to embrace and lie in close contact with a rounded portion 5 located just beyond the other loop end 2b.

An intermediate portion 6 of the strap is extended substantially at right angles to the longitudinal axis of the loop to offset the other end 7 of the strap and this offset end is apertured and adapted to lie against a frame or structural part S of the aircraft and be secured thereto by means of a suitable fastening 8 as shown in Figs. 1 and 2. The end 7 and the leg 2d of the loop w are substantially coplanar for joint contact throughout the length thereof with the structural part S as shown in Fig. 2.

It is now apparent that the end 7 of the strap extends outwardly beyond the end 4 and that the rounded portion 5 of the strap which is spaced inwardly and offset laterally from the end 7 converges and cooperates with the end 4 to form the "open" end of the loop 2. The portions 4 and 5 will abut in the plane of the longitudinal center line of the loop, while the end 7 is offset to one side of said plane and coplanar with the outer surface of the leg 2d of the loop for the purpose hereinbefore noted.

Inasmuch as the loop portion 2 is elongated the lower or closed end thereof is provided with means for securing the loop to the structural part S to prevent swinging or other movement of the loop. As here shown this means includes a tongue 9 in the form of a hook struck out from the strap 1 adjacent the closed end 3 of the loop and adapted to be snapped into an opening 10 in the part S as shown in Fig. 2 so as to hook around an edge of said opening.

Means is provided for clamping or locking the loop portion 2 in wire embracing position either before or after the clip is mounted on the supporting part S. This means comprises a rigid clamping loop 11 slidably mounted on the strap so that it may be brought into and out of position holding the portions 4 and 5 of the strap closely engaged with one another. A curved finger piece or handle 12 extends from the clamping loop 11 and when the latter is in locking position, will lie over the upper curved end of the outer leg 2e of the loop portion 2 in conformity thereto as shown in full lines in Fig. 2, and somewhat hooked around said outer leg. Upon lifting this finger piece the clamping loop may be pushed upwardly clear of the end 4 of the strap to the dotted position shown in Fig. 2 thereby permitting the loop to be opened to remove the wires therefrom. The opening in the clamping loop is rectangular and the angles and curves of the portions 4, 5, and 6 of the strap, together with the resiliency of such parts, provide for a tensioned binding and clamping of said portions together and a retention of the clamping loop in position embracing the portions 4 and 5 and the finger piece is pressed down to hook around the leg 2c of the loop. However, this finger piece may be readily lifted to move the clamping loop to the position to open the wire supporting loop 2.

To protect the wires against chafing, undue wear, and damage due to vibration stresses, and other stresses, the loop 2 is provided with a resilient cushion strip 14 of rubber or the like lining substantially the entire loop. This strip has marginal flanges 15 for embracing margins of the strap to hold the cushion thereon. As these flanges lie on the outer faces of the strap they serve as a cushion between the loop and the aircraft structural part S as shown in Fig. 5. The cushion is under compression when the clip is clamped on the wires and this provides an added resilient action throughout the clip and facilitates the clamping action of the loop 11.

In order that a light and small gauge metal, plastic or the like may be used, the strap is provided with outwardly struck reinforcing ribs 16 extending longitudinally throughout the legs of the loop portions 2 thereof.

I may, as here shown, lift the end portions 15a of the flanges 15 of the cushion 14 so that they will lie over and in tensioned contact with the finger piece 12 as shown in Figs. 1, 2 and 3 to hold the clamping loop in place. In this connection it should be noted that the finger piece 12 is provided on its inner face with a longitudinal groove to receive the rib 16 and also reinforce the finger piece by reason of the rib 17 formed by said groove.

In order to insure that each of the wires disposed in superposed relation to one another in the loop 2 will be engaged and held between the opposed legs of the loop, the outer leg is bowed inwardly between its ends as shown in Fig. 2 in the dotted line illustration of said leg. The full line showing indicates how the outer leg straightens and effects the desired clamping action when the loop is locked in wire supporting position.

It is now apparent that the clip of this invention provides a convenient and easily installable means for supporting electrical conductors in aircraft with the conductors safe-guarded and supported in line one above the other as clearly shown in Figs. 1 and 2 in small compass and each conductor subject to ready identity, inspection and access and the group of conductors subject to ready removal and replacement.

As shown in Fig. 7 I may construct the clip with the strap 20 formed as a circular loop 21 having abutting portions 22 and 23 corresponding to the portions 4 and 5 in the first described form of my invention, and provided with a similar clamping loop 24 and handle portion 25 thereon. An offset end 26 of the strap corresponding to end 7 is apertured and adapted to be secured to a structural part T of the aircraft. No tongue or hook corresponding to the one 9 is required in this form of my invention.

The wires are held in a group of circular cross section in this modified form and in some instances this form may be more desirable than the elongated form, especially in certain confined places.

I may provide a flexible tie element such as wire 27 secured to the handle portion 25 and adapted to be wrapped around a hook 28 struck out from the strap. This arrangement provides for releasably securing the clamping means in clamping position and obviously may be used in the elongated form of clip, if desired.

It should be borne in mind that while the clips hereof are primarily designed for supporting wires they may be used for supporting conduits or other lines or put to any supporting use for objects subject to being clamped and held in the loop portions thereof.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a supporting clip, a strap preformed to provide a loop portion for embracing an object to be supported, an offset portion on one end of the strap, the other end of the strap being movable into and out of contact with said offset portion to close and open the loop portion, a fastening hook extending from said strap and adapted to be hooked into an opening in said support, and means for clamping said other end and said offset portion together to close the loop portion.

2. In a supporting clip, a strap preformed to provide a loop portion for embracing and clamping an object to be supported, said strap having one end portion extended for attachment to a support with one leg of the loop lying against said support, said other end portion of the strap being movable into and out of overlapping contact with a portion of the strap which is spaced inwardly of said extended end portion, to close and open said loop portion, and a clamping member movable on the strap into and out of position embracing and clamping together overlapped portions of the strap.

3. In a supporting clip, a strap preformed to provide an elongated loop portion for embracing and clamping an object to be supported, said strap having one end portion extended beyond the other end portion thereof, and disposed for attachment to a support with one leg of the loop lying against said support, said other end portion of the strap being movable into and out of overlapping contact with a portion of the strap which is spaced inwardly of said extended end to close and open said loop portion, a clamping member movable on the strap into and out of position embracing and clamping together overlapped portions of the strap, and a tongue in the form of a hook projecting from adjacent the end of the loop portion farthest removed from said extended end of the strap for engaging said support to fasten the loop portion thereto.

4. In a supporting clip, a strap preformed to provide a loop portion for embracing and clamping an object to be supported, said strap having one end portion extended for attachment to a support with one leg of the loop lying against said support, said other end portion of the strap being movable into and out of overlapping contact with a portion of the strap which is spaced inwardly of said extended end to close and open said loop portion, and a clamping member movable on the strap into and out of position embracing and clamping together overlapped portions of the strap, said overlapping portions of the strap being correspondingly curved and adapted to be nested one within the other.

5. In a supporting clip, a strap preformed to provide a loop portion for embracing and clamping an object to be supported, said strap having one end portion extended for attachment to a support with one leg of the loop lying against said support, said other end portion of the strap being movable into and out of overlapping contact with a portion of the strap which is spaced inwardly of said extended end to close and open said loop portion, said overlapping portions of the strap being correspondingly curved and adapted to be nested one within the other, a clamping loop mounted to slide from extended end portion onto said curved overlapping portions and vice versa to clamp and release the clip respectively, and a handle on said clamping loop curved to conform to the curvature of the loop portion of the strap to lie thereagainst when the clamping loop is in clamping position.

6. In a supporting clip, a strap preformed to provide a loop portion for embracing and clamping an object to be supported, said strap having one end portion extended beyond the other end portion thereof, and disposed for attachment to a support with one leg of the loop lying against said support, said other end portion of the strap being movable into and out of overlapping contact with a portion of the strap which is spaced inwardly of said extended end to close and open said loop portion, a clamping member movable on the strap into and out of position embracing and clamping together overlapped portions of the strap, a hook on said strap, and a flexible tie element carried and engageabble with said clamping member and said hook to hold the clamping member in clamping position.

EUGENE M. MOREHOUSE.